C. E. BEACH.
APPARATUS FOR CHARGING STORAGE BATTERIES.
APPLICATION FILED SEPT. 24, 1910. RENEWED MAY 25, 1911.
1,082,187. Patented Dec. 23, 1913.
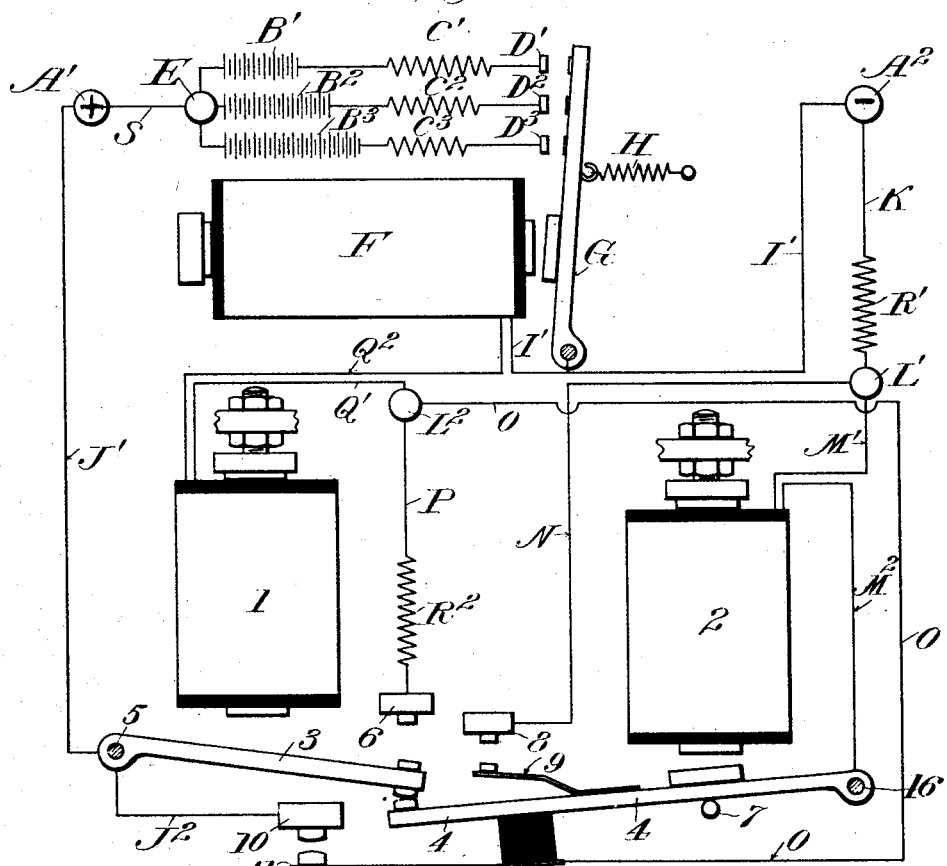
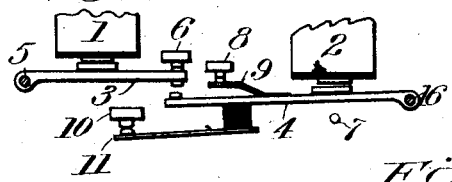
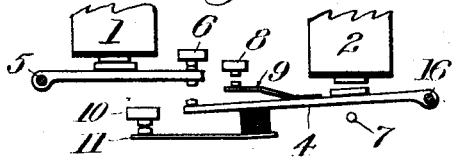
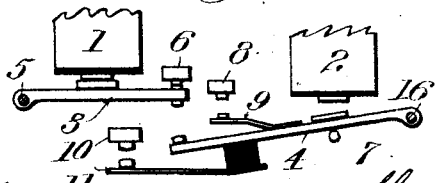

UNITED STATES PATENT OFFICE.

CLARENCE E. BEACH, OF BINGHAMTON, NEW YORK, ASSIGNOR TO GEORGE O. KNAPP, OF NEW YORK, N. Y.

APPARATUS FOR CHARGING STORAGE BATTERIES.

1,082,187.  Specification of Letters Patent.  Patented Dec. 23, 1913.

Application filed September 24, 1910, Serial No. 583,653. Renewed May 25, 1911. Serial No. 629,488.

*To all whom it may concern:*

Be it known that I, CLARENCE E. BEACH, a citizen of the United States, residing at Binghamton, in the county of Broome and State of New York, have invented certain new and useful Improvements in Apparatus for Charging Storage Batteries, of which the following is a specification.

My invention relates to electric charging systems for storage batteries in which mechanisms are controlled automatically by the potential of the charging source.

One of the objects of my invention is to provide a system so constructed that its mechanism will not vibrate or flutter either when the potential slowly rises from a point less than the counter electro-motive force of the batteries to be charged to a potential great enough to properly charge said batteries, or when the potential slowly decreases from a pressure great enough to overcome the counter electro-motive force of the batteries to be charged, and properly charge said batteries, to a pressure less than such counter electro-motive force.

Another object of my invention is to provide a system in which the mechanism can be so set that it will act to apply the charging current in response to a gradually increasing potential of the charging circuit only when such potential has reached a pressure greater than the minimum pressure required to maintain said system in charging condition while charging is in progress.

Another object of my invention is to so construct the mechanism forming part of such a system as to permit such adjustment that, although such mechanism positively maintains a connection between the charging source and the batteries to be charged while the potential of the charging circuit is such as would cause said mechanism to act to apply the charging current to the batteries if the batteries had been disconnected therefrom, yet such mechanism will surely cut off the charging current whenever the potential of the charging current falls but very slightly below the pressure which would be sufficient during a gradual increase of potential to cause said mechanism to act to apply the charging current to the batteries to be charged.

Another object of my invention is to provide mechanism in a system of this character, so constructed that after said mechanism has acted to connect the batteries to be charged with the source of charging current as the result of a predetermined potential being maintained by such charging current source, said mechanism will not act to disconnect said charging current from the storage batteries until the potential of the charging current has fallen to a predetermined point below the minimum potential at which said mechanism will act to connect the storage batteries to the charging current.

Another object of my invention is to provide mechanism in a system of this character, so constructed that after said mechanism has acted to disconnect the batteries from the charging current, as the result of a decrease to or below a predetermined point in the potential of the charging circuit, said mechanism will not act to again connect said charging current to the storage batteries until the potential of the charging current has increased to a predetermined point above the maximum potential at which said mechanism will act to disconnect the storage batteries from the charging current.

Another object of my invention is to provide mechanism in such a system, having three sets of magnets; the armature of the first set of magnets being arranged to act when the potential of the charging current rises to or above a predetermined value, the action of said first armature being to move so as to control a circuit whereby the second and third sets of magnets will be strongly energized; the armature of the second set of magnets being mechanically actuated by the armature of the first set of magnets and so arranged as to cut out the first set of magnets when the second armature is fully attracted and said second armature being arranged to maintain current through its own and the third set of magnets while said second armature is in its attracted position; and the armature of the third set of magnets being arranged to directly control the connection of the charging circuit with the storage batteries.

Another object of my invention is to provide mechanism in a system of this character in which positive and reliable operation of the charging current controlling contacts is assured by providing magnets for operating said contacts, which are so constructed that said contacts will be held firmly closed by a potential of the charging circuit substantially below the minimum potential at which the charging current should be applied to the storage batteries, and providing a second set of magnets arranged to control the contact operating magnets, which second set of magnets will release their armature when the potential of the charging circuit falls to a predetermined point which is greater than the counter electro-motive force of the batteries to be charged and substantially above the minimum potential of charging current capable of effectively energizing the contact operating magnets.

Another object of my invention is to provide mechanism in a system of the character described, which, when acting in response to an increase in the potential of the charging current, will cause the magnets intended to respond to a decrease in the potential of the charging current to be abnormally energized until said mechanism comes to rest, so that the armature intended to respond in cases of insufficient potential will not be disengaged from its magnets as a result of the jar incident to the operation of the mechanism.

A still further object of my invention is to provide a system employing mechanism including a normally retracted armature which will be attracted whenever the potential of the charging current rises to a predetermined point for the purpose of bringing its magnets into effective control of the charging current, the control of this normally retracted armature being so accomplished that it will not be immediately released from the attraction of its magnets when it has acted, but will be held a predetermined length of time before it is so released.

My invention comprises potential rise determining or starting electro-magnetic switch mechanism, potential fall determining or releasing electro-magnetic switch mechanism, and electro-magnetic switch mechanism for controlling the connection of a battery or batteries for charging, suitable circuits connecting together the various electro-magnet windings, their armatures, and the contacts associated therewith. The starting electro-magnet switch mechanism controls a primary energizing circuit for the releasing and battery electro-magnet switch mechanisms and is proportioned to respond only when the pressure of the supply circuit reaches a predetermined point which is greater than the counter electro-motive force of the single battery or of the battery having the greatest number of cells where several batteries are to be simultaneously charged in parallel. This primary energizing circuit is of sufficiently low resistance so that the releasing and battery electro-magnets will be fully saturated and powerfully energized. The releasing electro-magnet serves to control a holding circuit for maintaining energization after the primary circuit has been interrupted, and is designed to open this holding circuit as soon as the potential across the terminals of this circuit approaches, but is still greater than, the counter electro-motive force of the battery. As it requires less current flow for an electro-magnet to retain its armature in attracted position than is required to primarily energize the electro-magnet sufficiently to attract its armature, provision is made to reduce the current flow through the holding circuit so that the releasing electro-magnet will respond to open the holding circuit as soon as the potential of the charging circuit approaches the counter electro-motive force of the battery. The primary lower resistance energizing circuit should also be kept closed a sufficient length of time to allow thorough saturation of the releasing and battery electro-magnets. Accordingly, the armature of the releasing electro-magnet is arranged to be primarily out of attractive range of its electro-magnet, and this armature and that of the starting electro-magnet are interlocked so that upon effective closure of the primary energizing circuit the efforts of both the electro-magnets will carry the releasing electro-magnet armature to attracted position, and when thus moved to attracted position it will be held by the releasing electro-magnet. Provision is made for including a resistance in the holding circuit when the releasing electro-magnet armature has been moved to attracted position and the starting armature is retracted so that the current flow through this circuit is cut down and the releasing electro-magnet enabled to release its armature when the holding circuit potential approaches the battery counter electro-motive force. Provision is also made to shunt out the starting electro-magnet as soon as the holding circuit is closed, and thereby permit its magnetization to gradually diminish and thus assure its armature being retained in attracted position for a time much longer than would be the case if the circuit through this magnet was broken, but contact mechanism controlled by the starting electro-magnet and included in the primary energizing circuit will not be opened until the starting electro-magnet armature has been materially retracted. The lower resistance primary energizing circuit will not be opened until the starting electro-magnet armature has been materially retracted. The lower resistance primary energizing circuit is thus kept closed for a substantial interval after closure of the holding circuit to assure full and complete energization of the releasing electro-magnet and battery controlling electro-magnet. Upon eventual opening of this primary energizing circuit the higher resistance holding circuit will be entirely controlled by the releasing electro-magnet, and when the potential of the charging circuit falls to a predetermined point, the releasing electro-magnet will be sufficiently deënergized to release its armature, whereby circuit is completely broken through the releasing electro-magnet and the battery electro-magnet, and the batteries disconnected from the charging system.

Referring to the accompanying drawings, which shows one embodiment of the invention, Figure 1 is a diagrammatic view of the entire apparatus, the control-mechanism being shown in elevation; and Figs. 2, 3 and 4 are detail views of the lower part of magnets 1 and 2, showing their armature levers in three different positions.

In Fig. 1, $A^1$ and $A^2$ represent the terminals of a source of current for charging storage batteries. $B^1$, $B^2$ and $B^3$ represent the batteries to be charged. $C^1$, $C^2$ and $C^3$ represent resistances respectively in series with the different batteries. The number of cells in the several batteries need not be uniform, the set marked $B^1$ having the fewest cells and the set marked $B^3$ having the greatest number. The resistance $C^1$ in circuit with battery $B^1$ is larger than either of the other resistances and the resistance $C^3$ in circuit with battery $B^3$ is smaller than either of the others. The battery circuits are shown provided at one end with the contacts $D^1$, $D^2$, $D^3$, respectively, and as being all connected at the other end to the terminal E. It is evident that separate terminals may be provided at both ends of these loops, provided the batteries are connected in parallel to the source of current and that at least one end of the respective loops is disconnected from each other when the current is cut off.

A relay is provided, comprising the electromagnet F, armature and carrier G, and retractile spring H. A wire $I^1$ connects the armature carrier G to the charging-current terminal $A^2$, and also connects one side of the electromagnet F to terminal $A^2$.

A starting electro-magnet 2 and a releasing electro-magnet 1 are also provided and control armature levers 4 and 3 respectively. These armature levers are mounted on pivots 16 and 5, respectively, in such position that the free end of lever 4 moves in the path of the free end of lever 3 and that armature lever 4 may support lever 3 at certain times. A stationary contact 6 is provided in the path of the lever 3, arranged to limit the movement of said lever in the direction of the magnet 1. A stop 7 is provided in the path of the lever 4, arranged to limit the motion of said lever 4 away from the magnet 2. A stationary contact 8 is provided in the path of a contact spring 9 carried by and connected to the lever 4. Contact 8 is in such position that when lever 4 moves in the direction of magnet 2, the spring 9 will bear against contact 8 before the motion of armature lever 4 is arrested by its causing armature lever 3 to be brought against stop 6. A stationary contact 10 is mounted in the path of a contact spring 11 carried by and insulated from lever 4. Contact 10 is so located that when lever 4 moves in the direction of magnet 2, contact spring 11 will bear against contact 10 before lever 4 has moved a sufficient distance in the direction of magnet 2 to bring spring 9 against contact 8. A wire $J^1$ connects the terminal $A^1$ to the pivot 5 of lever 3, and a wire $J^2$ connects said terminal and armature-pivot to contact 10. A resistance $R^1$ is connected at one end to the terminal $A^2$ by a wire K, its other end being connected to a terminal $L^1$. A wire $M^1$ connects one side of magnet 2 to the terminal lever 4. A wire N conects the terminal $L^1$, and a wire $M^2$ connects its other end to the pivot 16 of lever 4. A wire N connects terminal $L^1$ to contact 8. A wire O connects contact spring 11 to terminal $L^2$, and a wire P connects terminal $L^2$ to one end of resistance $R^2$, the other end of said resistance being connected to contact 6. A wire $Q^1$ connects one side of the magnet 1 to terminal $L^2$, the other side of magnet 1 being connected by means of the wire $Q^2$ to one side of magnet F, and the other side of magnet F being connected to wire $I^1$. The resistance $R^1$ is provided so that when magnet 2 is shunted the current flow will not be too greatly increased and magnet 2 is so adjusted that when the lever 4 is resting upon the stop 7, the current flowing through magnet 2 will not be sufficient to raise the levers 3 and 4 until the difference of potential between terminals $A^1$ and $A^2$ is greater than the counter-electro-motive force of any of the batteries to be charged, for instance battery $B^3$. The resistance $R^2$ is such as will cut down the current passing through magnet 1 to a point where the armature lever 3 will be permitted to drop from the contact 6 before the difference of potential between the terminals $A^1$ and $A^2$ falls to a point equal to the counter-electro-motive force of the strongest battery to be charged, for instance $B^3$.

Referring to Fig. 1, when the potential across terminals $A^1$ $A^2$ is greater than the battery counter electro-motive force, the electro-magnet 2 will become sufficiently energized to attract its armature 4 through the circuit from terminal $A^1$, through wire $J^1$, pivot 5, lever 3, lever 4, pivot 16, wire $M^2$, electro-magnet 2, wire $M^1$, terminal $L^1$, resistance $R^1$, and wire K to terminal $A^2$, and this circuit may be called a starting circuit. Under these circumstances the circuit through the magnets F and 1 is open at both contacts 6 and 10, so these magnets will not be energized, and the circuit through batteries B¹, B² and B³ is also open, because the lever G is not then resting against the terminals D¹, D² and D³.

If now the difference of potential between the terminals A¹ and A² is raised to a point greater than the counter-electro-motive force of the strongest battery to be charged, as for instance B³, sufficient current will flow through magnet 2 to cause it to lift lever 4, and thereby lift lever 3 until contact spring 11 bears against contact 10, whereupon magnets 1 and F will be energized by a direct primary circuit. The path of current through magnets 1 and F when energized by the contact spring 11 resting against the contact 10 is as follows:—terminal A¹, wires J¹ and J², contact 10, contact spring 11, wire O, terminal L², wire Q¹, magnet 1, wire Q², magnet F, wire I¹, terminal A². Upon the magnet F being thus powerfully energized, lever G is moved by this magnet until it rests against the contacts D¹, D² and D³ and completes the charging circuit of the batteries B¹, B² and B³. The path of current through said batteries is as follows:—terminal A¹ and wire S to terminal E, where the current divides, one part going through the battery B¹, another part of said current through the battery B², and the balance of said current through the battery B³; from battery B¹ the current passes through resistance C¹ to contact D¹; from battery B² the current passes through resistance C² to contact D²; and from battery B³ the current passes through resistance C³ to contact D³. From the contacts D¹, D² and D³, the current passes through lever G to wire I¹ and thence to terminal A². Between the armature 3 and the adjacent pole of the releasing electromagnet there is a considerable air gap, and electro-magnet 1, although powerfully energized upon inclusion in the direct primary circuit, will not of itself have sufficient strength to draw the armature into attracted position. The armature 4, which at its end bears against the under side of the armature 3, will assist the attractive force of the electro-magnet 1, and the armature 3 will, by the combined efforts of the two electro-magnets, be moved into its attracted position. The continued motion of lever 4 in the direction of magnet 2 will bring contact spring 9 against contact 8, thus forming a shunt circuit of low resistance around magnet 2, so that nearly all of the current passing through resistance R¹ will pass through wire N to contact 8, thence through contact spring 9, lever 4, lever 3 and wire J¹ to the terminal A¹, without passing through wire M¹, magnet 2 and wire M². This shunt gradually deenergizes magnet 2, but on account of the magnet being short-circuited the fall of magnetism will be relatively slow and there will be a continuation of the pull on lever 4 for a sufficient length of time to cause said lever 4 to assist in bringing lever 3 fully against contact 6 and also to permit armature G to rest against contacts D¹, D², D³, besides holding the circuit through contact 10 and spring 11 closed for a long enough period so that if there is any chatter either of lever 3 against contact 6 or lever G against contacts D¹, D², D³, this chatter will have entirely ceased before the lever 4 commences to fall.

When lever 4 commences to fall after electro-magnet 2 has been deënergized, lever 3 will not follow, being held against contact 6 by electro-magnet 1, the current through said electro-magnet being sufficient to retain the armature 3 in attracted position. The connection between the lever 3 and lever 4 will therefore be interrupted as soon as lever 4 has fallen to the point indicated in Fig. 2, thus interrupting the flow of current through magnet 2 and through the shunt around said magnet, through wire N, contact 8 and spring 9. The continued fall of lever 4 will next result in spring 9 ceasing to touch contact 8 (Fig. 3), but during all this time the connection between spring 11 and contact 10 is maintained, thus keeping the strong current flowing through the magnets F and 1. The further movement of lever 4 away from magnet 2 will carry spring 11 away from contact 10, and the armatures of the magnets 1 and 2 will then occupy the positions shown in Fig. 4. After spring 11 ceases to touch contact 10, the current passing from terminal A² through magnets F and 1 can no longer pass through the wire O and directly back to the terminal A¹, but instead may pass from terminal L² through wire P, resistance R², contact 6 and lever 3 to wire J¹ and back to charging terminal A¹, thus cutting down the volume of current passing through the magnets F and 1 by leaving the resistance R² in the path of said current, and breaking the shunt which had previously been maintained around said resistance through the wire O, spring 11 and contact 10.

The purpose of at first permitting a strong current to pass through the magnets F and 1 is to sufficiently energize these magnets so that their armatures will be firmly attracted to them, and there will be no flutter or tendency for these magnets to release their armatures immediately after having attracted them, and more especially to make sure that after the armature lever 3 has been moved against contact 6 by the assistance of armature lever 4, magnet 1 will certainly hold said lever 3 in position while the lever 4 is falling away from magnet 2. Another important reason for sending through an extra strong current while the lever 4 is acting is that if this mechanism is so proportioned that there is very little difference between the predetermined potential between the terminals A¹ and A² at which magnet 1 is set to release its armature, and the potential between terminals A¹ and A² at which magnet 2 is set to lift its armature, magnet 1 and its armature would not become sufficiently saturated while lever 3 was being supported by lever 4 to enable magnet 1 to support lever 3 after lever 4 had ceased to support lever 3. The result would be that these levers would flutter and vibrate when the magnets were energized by such potential, although operating satisfactorily with a somewhat greater potential. Furthermore, it is well known that when an electro-magnet is energized to a point materially below its point of saturation, it will release its armature when the current is decreased to a value which is much greater than that at which it would finally have released it if the current had been cut down from a point where the core was magnetically saturated or practically so. Thus omitting resistance R² but with the remaining parts in the position shown in Fig. 1 and with wire P connecting terminal L² and contact 6, if the potential between the charging terminals A¹ and A² is raised to 110 volts and the resistance R¹ is then adjusted so that the magnet 2 will just barely raise its armature, and thereupon the potential is decreased to 109 volts and the magnet 1 so adjusted with relation to the lever 3 that this lever will thereupon fall, if a potential difference of say 130 volts is applied at the terminals A¹ and A² and such potential is gradually decreased, magnet 1 will not permit lever 3 to fall until the potential falls to a point materially below 109 volts, whereas if a properly proportioned resistance R² is used, lever 3 will drop at 109 volts in both instances.

Magnet F should be so proportioned to magnet 1 that it will hold armature G against contacts D¹, D², D³ as long as the current passing through said magnet F is sufficient to cause the magnet 1 to hold lever 3 against contact 6. When sufficient potential is applied between the terminals A¹, A² and levers 3, 4 have assumed the positions shown in Fig. 4, there are two parallel paths of current from terminal A¹, as follows: one path separating into three parallel paths between terminal E and contacts D¹, D², D³, against which lever G is resting; the other path through wire J¹, lever 3, contact 6, resistance R², wire P, terminal L², wire Q¹, magnet 1, wire Q², magnet F, a portion of wire I¹ to armature G, and thence through the balance of wire I¹ to terminal A².

I do not of course desire to be limited to the exact operation and arrangement shown and described, as changes may be made which would still come within the scope of the invention.

I claim:

1. In a storage battery controlling system, the combination of a charging circuit, a switch for said charging circuit, an electro-magnet for controlling said switch, a starting electro-magnet and switch mechanism therefor including an armature, a releasing electro-magnet and switch mechanism therefor including an armature, a primary energizing circuit for said battery switch controlling electro-magnet controlled by said starting electro-magnet, a holding circuit for said battery switch controlling electro-magnet controlled by said releasing electro-magnet, and a circuit for said releasing electro-magnet controlled by said starting electro-magnet.

2. In a storage battery system, the combination of a charging circuit, a relay for controlling said circuit, a primary energizing circuit for said relay, a starting relay controlled by current flow from a charging current supply source for controlling said primary energizing circuit, a holding circuit of increased resistance for said charging circuit relay, and a releasing relay operated by said starting relay for controlling said holding circuit.

3. In a storage battery system, the combination of a charging circuit, a starting relay controlled by current flow from a charging current supply source, a releasing relay controlling the charging circuit, means whereby the starting relay may mechanically operate the releasing relay at certain times, a primary energizing circuit for the releasing relay controlled by the starting relay, and a holding circuit of increased resistance for said releasing relay.

4. In a storage battery charging system, the combination of a charging circuit, a relay for controlling the connection of said charging circuit with a charging current supply circuit, a primary energizing circuit for said relay, a starting relay controlled by current flow from the supply circuit to close said primary energizing circuit, said primary energizing circuit allowing sufficient current flow through said charging circuit controlling relay to cause full energization thereof, a holding circuit of increased resistance for said charging circuit controlling relay, and a releasing relay operated by current flow through said primary energizing circuit for controlling said holding circuit.

5. In a storage battery system, the combination of a charging circuit, a relay for controlling said circuit, a primary energizing circuit for said relay, a starting relay controlled by current flow from a charging current supply source for controlling said primary energizing circuit, a holding circuit of increased resistance for said charging circuit relay, a releasing relay controlled at certain times by said starting relay for controlling said holding circuit, and means for opening said primary energizing circuit after closure of said holding circuit.

6. In a storage battery system, the combination of a charging circuit, a relay for controlling said circuit, a primary energizing circuit for said relay, a starting relay controlled by current flow from a charging current supply source for controlling said primary energizing circuit, a holding circuit of increased resistance for said charging circuit relay, a releasing relay controlled at certain times by said starting relay for controlling said holding circuit, and means for disabling said starting relay to cause opening of said primary energizing circuit after closure of said holding circuit.

7. In a storage battery controlling system, the combination of a charging circuit, a relay controlling said circuit, a primary energizing circuit for said relay, a starting relay controlling said primary energizing circuit, a releasing relay, and a holding circuit for said charging circuit relay controlled conjointly by said starting and releasing relays.

8. In a storage battery system the combination of a charging circuit, a starting relay controlled from a supply circuit, a releasing relay controlling said charging circuit, means controlled by the starting relay for operating the releasing relay at certain times, a primary energizing circuit for the releasing relay, a holding circuit for said releasing relay, means operated by the starting relay for controlling said holding circuit at certain times, and means controlled by the releasing relay for controlling said holding circuit at other times.

9. In a storage battery system, the combination of a charging circuit, a relay controlling said charging circuit, a starting relay, a releasing relay, a primary energizing circuit for said charging circuit controlling relay controlled by said starting relay, a holding circuit for said charging circuit controlling relay primarily controlled conjointly by said starting and releasing relays, and means for eliminating the control of said holding circuit by said starting relay whereby said holding circuit is controlled solely by said releasing relay.

10. In a storage battery system, the combination of a charging circuit, a relay controlling said charging circuit, a starting relay, a releasing relay, a primary energizing circuit for said charging circuit controlling relay controlled by said starting relay, a holding circuit for said charging circuit controlling relay primarily controlled conjointly by said starting and releasing relays, and means for eliminating the control of said holding circuit by said starting relay whereby said holding circuit is controlled solely by said releasing relay, said holding circuit being of increased resistance.

11. In a storage battery charging system, the combination of a charging circuit, a relay controlling said circuit, a primary energizing circuit for said relay, a starting relay controlling said primary energizing circuit, a releasing relay included in said primary circuit, and a holding circuit for said charging circuit controlling relay and controlled by said releasing relay, said holding circuit being of greater resistance than said primary circuit.

12. In a storage battery charging system, the combination with a charging circuit of a starting relay, a releasing relay controlling the said charging circuit, a low resistance primary energizing circuit for the releasing relay, means operated by the starting relay for controlling said primary energizing circuit, and a high resistance holding circuit for and controlled by said releasing relay.

13. In a storage battery charging system, the combination with a charging circuit of a starting relay, a releasing relay controlling said charging circuit, a primary energizing circuit for the releasing relay, means operated by the starting relay for controlling said primary energizing circuit, a holding circuit for and controlled by said releasing relay, and a resistance in said holding circuit.

14. In a storage battery charging system, the combination of a charging circuit, a relay controlling said circuit, a primary energizing circuit for said relay, a starting relay controlling said primary energizing circuit, and a holding circuit for said charging circuit controlling relay and controlled by a releasing relay, said releasing relay being included in the holding circuit, and said holding circuit being of greater resistance than the primary energizing circuit.

15. In a storage battery system, the combination of a charging circuit, a relay for controlling the connection of said charging circuit with a charging current supply circuit, a starting relay, a releasing relay, a starting circuit including said starting relay and normally closed through contacts of said starting and releasing relays, said starting circuit being connected with the supply circuit, a primary energizing circuit for said charging circuit controlling relay closed upon actuation of said starting relay, a holding circuit for said charging circuit controlling relay controlled conjointly by the armatures of said starting and releasing relays, and means for disabling said starting relay whereby the primary energizing circuit will be opened and the holding circuit controlled solely by said releasing relay.

16. In a storage battery system, the combination of a charging circuit, a relay for controlling the connection of said charging circuit with a charging current supply circuit, a starting relay, a releasing relay, a starting circuit including said starting relay and normally closed through contacts of said starting and releasing relays, said starting circuit being connected with the supply circuit, a primary energizing circuit for said charging circuit controlling relay closed upon actuation of said starting relay, a holding circuit for said charging circuit controlling relay controlled conjointly by the armatures of said starting and releasing relays, and means for disabling said starting relay whereby the primary energizing circuit will be opened and the holding circuit controlled solely by said releasing relay, the winding of the releasing relay being included in both said primary and holding circuits.

17. In a storage battery system, the combination of a charging circuit, a relay for controlling the connection of said charging circuit with a charging current supply circuit, a starting relay, a releasing relay, a starting circuit including said starting relay and normally closed through contacts of said starting and releasing relays, said starting circuit being connected with the supply circuit, a primary energizing circuit for said charging circuit controlling relay closed upon actuation of said starting relay, a holding circuit for said charging circuit controlling relay controlled conjointly by the armatures of said starting and releasing relays, means for maintaining closure of the primary circuit controlling the closing operation of the holding circuit, and means for disabling the starting relay after closure of said holding circuit whereby said primary circuit is opened and the holding circuit controlled solely by the releasing relay.

18. In a storage battery system, the combination of a charging circuit, a relay for controlling the connection of said charging circuit with a charging current supply circuit, a starting relay, a releasing relay, a starting circuit including said starting relay and normally closed through contacts of said starting and releasing relays, said starting circuit being connected with the supply circuit, a primary energizing circuit for said charging circuit controlling relay closed upon actuation of said starting relay, a holding circuit for said charging circuit controlling relay controlled conjointly by the armatures of said starting and releasing relays, and a shunt for the starting relay effective after closure of the holding circuit to disable the starting relay whereby the primary circuit is opened and the holding circuit controlled solely by the releasing relay.

19. In a storage battery system, the combination of a charging circuit, a relay for controlling the connection of said charging circuit with a charging current supply circuit, a starting relay, a releasing relay, a starting circuit including said starting relay and normally closed through contacts of said starting and releasing relays, said starting circuit being connected with the supply circuit, a primary energizing circuit for said charging circuit controlling relay closed upon actuation of said starting relay, a holding circuit for said charging circuit controlling relay controlled conjointly by the armatures of said starting and releasing relays, and a shunt for the starting relay effective after closure of the holding circuit to disable the starting relay whereby the primary circuit is opened and the holding circuit controlled solely by the releasing relay, said shunt being controlled by said starting relay.

20. In a storage battery system, the combination of a charging circuit, a relay for controlling the connection of said charging circuit with a charging current supply circuit, a starting relay, a releasing relay, a starting circuit including said starting relay and normally closed through contacts of said starting and releasing relays, said starting circuit being connected with the supply circuit, suitable operating and controlling circuits for the releasing relay connected with the supply circuit and controlled at times by the starting relay, and a shunt for and controlled by the starting relay.

21. In a storage battery system, the combination of a charging circuit, a charging current supply circuit, a starting relay normally connected to the charging current supply circuit, a releasing relay controlling a connection between the charging circuit and the charging current supply circuit, means whereby the starting relay may operate the releasing relay at certain times, a shunt for the starting relay effective after said starting relay has operated the releasing relay, means controlled by the armature of the starting relay for breaking the connection between said starting relay and the charging current supply circuit at certain times, and means controlled by the releasing relay for completing the connection between the starting relay and the charging current supply circuit.

22. In a storage battery system, the combination of a charging circuit, a charging current supply circuit, a starting relay normally connected to the charging current supply circuit, a releasing relay controlling a connection between the charging circuit and the charging current supply circuit, means whereby the starting relay may operate the releasing relay at certain times, a shunt for the starting relay effective after said starting relay has operated the releasing relay, and a means controlled by the releasing relay for completing the connection between the starting relay and the charging current supply circuit.

23. In a storage battery system, the combination of a charging circuit, a charging current supply circuit, a starting relay normally connected to the charging current supply circuit, a releasing relay controlling a connection between the charging circuit and the charging current supply circuit, a shunt for and controlled by the starting relay, and means controlled by the releasing relay for completing the connection between the starting relay and the charging current supply circuit.

24. In a storage battery system, the combination of a charging circuit, a charging current supply circuit, a starting relay normally connected to the charging current supply circuit, a releasing relay controlling a connection between the charging circuit and the charging current supply circuit, means whereby the starting relay may operate the releasing relay at certain times, a shunt for and controlled by the starting relay, means controlled by the armature of the starting relay for breaking the connection between said starting relay and the charging current supply circuit at certain times, and means controlled by the releasing relay for completing the connection between the starting relay and the charging current supply circuit.

25. In a storage battery system, the combination of a charging circuit, a charging current supply circuit, a starting relay normally connected to the charging current supply circuit, a releasing relay controlling a connection between the charging circuit and the charging current supply circuit, means whereby the starting relay may operate the releasing relay at certain times, a shunt for and controlled by the starting relay, and means controlled by the armature of the starting relay for breaking the connection between said starting relay and the charging current supply circuit at certain times.

26. In a storage battery system, the combination of a charging circuit, a charging current supply circuit, a starting relay normally connected to the charging current supply circuit, a releasing relay controlling a connection between the charging circuit and the charging current supply circuit, a shunt for and controlled by the starting relay, means operated by the starting relay for closing said shunt circuit when its armature is fully attracted and means operated conjointly by the starting and releasing relays for breaking and closing the connection between the starting relay and the charging current supply circuit at certain times.

27. In a storage battery system, the combination of a charging circuit, a charging current supply circuit, a starting relay normally connected to the charging current supply circuit, a releasing relay controlling a connection between the charging circuit and the charging current supply circuit, a shunt for and controlled by the starting relay, means operated by the starting relay for closing said shunt circuit at certain times, and means for breaking and closing the connection between the starting relay and the charging current supply circuit at certain times.

28. In a storage battery system, the combination of a charging circuit, a charging current supply circuit, a starting relay normally connected to said charging current supply circuit, means controlled by the starting relay for causing the charging circuit to be connected to the charging current supply circuit at certain times, a shunt for and controlled by said starting relay, and means whereby the retraction of the armature of the starting relay may break the connection of said relay with the charging current supply circuit at certain times.

29. In a storage battery system, the combination of a charging circuit, a charging current supply circuit, a starting relay normally connected to said charging current supply circuit, means controlled by the starting relay for causing the charging circuit to be connected to the charging current supply circuit at certain times and a shunt for and controlled by said starting relay.

30. In a storage battery system, the combination of a charging circuit, a charging current supply circuit, a starting relay normally connected to said charging current supply circuit, means controlled by the starting relay for causing the charging circuit to be connected to the charging current supply circuit at certain times, and means controlled by said starting relay whereby said relay will be first shunted and then disconnected from the charging current supply circuit after its armature has been attracted.

31. In a storage battery system, the combination of a charging circuit, a charging current supply circuit, a relay normally connected to said charging current supply circuit, means controlled by said relay for causing the charging circuit to be connected to the charging current supply circuit at certain times and means operated by said relay whereby its armature after attraction will be retained in attracted position for a short time and thereupon released by its magnets and its connection with the charging current supply circuit broken.

32. In a storage battery system, the combination of a charging circuit, a charging current supply circuit, a relay normally connected to said charging current supply circuit, means controlled by said relay for causing the charging circuit to be connected to the charging current supply circuit at certain times and means operated by said relay whereby its armature after attraction will be retained in attracted position for a short time and thereupon released by its magnets.

33. In a storage battery system, the combination of a charging circuit, a relay for controlling the connection of said charging circuit with a current supply circuit, a starting relay controlling first, second and third contact mechanisms, an energizing circuit for said starting relay normally closed at said first contact mechanism, said second and third contact mechanisms being normally opened and adapted for consecutive closure upon energization of said starting relay, a primary energizing circuit for said charging circuit controlling relay closed by said second contact mechanism upon energization of the starting relay, a holding circuit for the charging circuit controlling relay, a releasing relay having an armature adapted when attracted to control said holding circuit, and a disabling circuit for said starting relay controlled by said third contact mechanism after closure of the holding circuit, said second contact mechanism being controlled to open the primary energizing circuit after said disabling circuit becomes effective.

34. In a storage battery system, the combination of a charging circuit, a relay controlling the connection of said charging circuit with a current supply circuit, a starting relay, a starting circuit for connecting said starting relay with the current supply circuit, a primary energizing circuit for said charging circuit controlling relay controlled by said starting relay, a holding circuit for said charging circuit controlling relay, a releasing relay for controlling said holding circuit, and means for opening said primary energizing circuit after closure of the holding circuit, said starting relay being responsive only when the supply circuit potential is greater than the counter electromotive force of a battery in the charging circuit, and means for causing said releasing relay to open the holding circuit before the main circuit potential drops to the counter potential of the battery.

35. In a storage battery charging system, the combination of a charging circuit for batteries, a relay for controlling the connection of said charging circuit with a current supply circuit, a starting relay, an energizing circuit for said starting relay connected with the current supply circuit, an energizing circuit for said charging circuit controlling relay controlled by the starting relay to be connected with the supply circuit, a releasing relay, said energizing circuit for said charging circuit relay including said releasing relay, a holding circuit controlled by said releasing relay and including said releasing relay, said starting relay being adjusted to respond only when the supply circuit potential is greater than the counter potential of the charging battery and said holding circuit being of such resistance as to cause opening thereof by the releasing relay before the supply circuit potential drops to the battery counter potential.

36. In a storage battery system, the combination of a charging circuit, a relay controlling the connection of said charging circuit with a main supply circuit, a starting relay and a releasing relay, an energizing circuit for said starting relay connected with the supply circuit, a primary energizing circuit for said charging circuit controlling relay including said releasing relay and closed upon actuation of said starting relay, current flow through said primary energizing circuit being insufficient to cause said releasing relay to move its armature to attracted position, said armature being, however, mechanically associated with the armature of the starting relay to be assisted in its movement to attracted position upon energization of both relays, a holding circuit for the charging circuit controlling relay closed when said releasing relay armature has been moved to attracted position, and means for disabling the starting relay after closure of the holding circuit whereby the primary energizing circuit is opened and the holding circuit controlled solely by the releasing relay.

37. In a storage battery system, the combination of a charging circuit, a relay controlling the connection of said charging circuit with a main supply circuit, a starting relay and a releasing relay, an energizing circuit for said starting relay connected with the supply circuit, a primary energizing circuit for said charging circuit controlling relay including said releasing relay and closed upon actuation of said starting relay, current flow through said primary energizing circuit being insufficient to cause said releasing relay to move its armature to attracted position, said armature being, however, mechanically associated with the armature of the starting relay to be assisted in its movement to attracted position upon energization of both relays, a holding circuit for the charging circuit controlling relay closed when said releasing relay armature has been moved to attracted position, and means for disabling the starting relay after closure of the holding circuit whereby the primary energizing circuit is opened and the holding circuit controlled solely by the releasing relay, said holding circuit being of greater resistance than the primary energizing circuit.

38. In a storage battery system, the combination of a charging circuit, a relay controlling the connection of said charging circuit with a current supply circuit, a starting relay and a releasing relay having their armatures electrically and mechanically associated, an energizing circuit for said starting relay connected with said current supply circuit and normally including said armatures, a primary energizing circuit for said charging circuit controlling relay including said releasing relay and having its connection with the supply circuit controlled by said starting relay, the current flow through said primary energizing circuit being insufficient to cause the releasing relay to move its armature to attracted position, but the movement of said armature to attracted position being assisted by the mechanically associated armature of the starting relay, a holding circuit for the charging circuit controlling relay including said releasing relay and closed when said releasing relay armature has been moved to attracted position, and means for disabling said starting relay after closure of the holding circuit whereby said starting relay armature is disassociated from the releasing relay armature and said holding circuit then controlled solely by said releasing relay.

39. In a storage battery system, the combination of a charging circuit, a relay controlling the connection of said charging circuit with a current supply circuit, a starting relay and a releasing relay having their armatures electrically and mechanically associated, an energizing circuit for said starting relay connected with said current supply circuit and normally including said armatures, a primary energizing circuit for said charging circuit controlling relay including said releasing relay and having its connection with the supply circuit controlled by said starting relay, the current flow through said primary energizing circuit being insufficient to cause the releasing relay to move its armature to attracted position, but the movement of said armature to attracted position being assisted by the mechanically associated armature of the starting relay, a holding circuit for the charging circuit controlling relay including said releasing relay and closed when said releasing relay armature has been moved to attracted position, said starting relay being adapted to shunt itself during the closing operation of the holding circuit whereby its armature is disengaged from the releasing relay armature and the primary energizing circuit opened and the energization of the charging circuit electro-magnet controlled solely by the releasing relay.

40. In an electrical system, the combination of a charging circuit, a relay for controlling said circuit, a second relay, a shunt circuit including the windings of said first and second relays and contacts of said second relay, a third relay having an armature adapted to initially actuate the armature of the second relay, opposed contacts on said armatures, a shunt circuit around the contacts of the second relay, including a fixed contact and a second contact on the armature of the third relay, and a shunt circuit around the third relay including a fixed contact, and a third contact on said third relay armature.

41. In an electrical system, the combination of a charging circuit, a relay for controlling said circuit, a second relay, a shunt circuit including the windings of said first and second relays and contacts of said second relay, a third relay having an armature adapted to initially actuate the armature of the second relay, opposed contacts on said armatures, a shunt circuit around the contacts of the second relay, including a fixed contact and a second contact on the armature of the third relay, and a shunt circuit around the third relay including a fixed contact, and a third contact on said third relay armature, the contacts on said third relay armature being arranged to successively close the shunt about the second relay contacts and the shunt about the third relay and to successively open the second relay contacts, the third relay shunt circuit, and the shunt circuit for the second relay contacts.

42. A battery-charging circuit comprising a current path between charging terminals including the battery and a circuit-closing switch, a second current path including a magnet controlling said switch, a relay and a double-circuit breaker controlled by said relay, a third current path including the switch-control magnet, said relay and a second circuit-breaker, a fourth circuit including a second relay having a normally-open shunt, said second relay having means for controlling said second circuit-breaker and said shunt.

43. A battery-charging circuit comprising a current path between charging terminals including the battery and a circuit-closing switch, a second current path including a magnet controlling said switch, a relay, a resistance, and a double-circuit breaker controlled by said relay, a third current path including the switch-control magnet, said relay and a second circuit-breaker, a fourth circuit including a second relay having a normally-open shunt, and a primary circuit controller, said second relay having means for controlling said second circuit-breaker and said shunt.

44. A battery-charging circuit comprising a battery-circuit closing switch and an operating magnet therefor, a relay controlling the circuit of said magnet, said relay adapted to release its armature on a diminution of voltage, and a second relay having a normally-open shunt, said second relay being adapted to attract its armature at a predetermined voltage and having means for closing the circuit of said first relay, and means for controlling its own shunt circuit.

45. A battery-charging circuit comprising a battery-circuit closing switch, a relay, means whereby said relay may control said battery-circuit closing switch, means whereby said relay will release its armature on a diminution of voltage, a second relay having a normally-open shunt, said second relay being adapted to attract its armature at a predetermined voltage and having means for actuating the first relay and means for controlling its own shunt circuit.

46. A battery-charging circuit comprising a battery-circuit closing switch and an operating magnet therefor, a relay controlling the circuit of said magnet, said relay adapted to release its armature on a diminution of voltage, and a second relay having a normally-open shunt but included in a normally-closed current path between the charging circuit terminals, said second relay being adapted to attract its armature at a predetermined voltage and having means for closing the circuit of said first relay, means for controlling its own shunt circuit and means for controlling said current path.

47. A battery-charging circuit comprising a battery-circuit closing switch and an operating magnet therefor, a relay controlling the circuit of said magnet, said relay adapted to release its armature on a diminution of voltage, and a second relay having a normally-open shunt but included in a normally-closed current path between the charging circuit terminals, said path being under control of both relays, said second relay being adapted to attract its armature at a predetermined voltage and having means for closing the circuit of said first relay, and means for controlling its own shunt circuit.

48. A battery-charging circuit comprising a battery-circuit closing switch, a controlling magnet for said switch, a relay having a circuit, a current path including a second relay having around it a normally-open shunt, an armature for said second relay, said armature having circuit-controlling devices for closing in succession the first relay circuit and the shunt circuit.

49. The combination with a relay in a current path between two terminals of a switch for said path, an armature for said relay controlling said switch, a second relay in a separate current path between said terminals, an armature for said second relay, the two armatures together controlling said separate current path, a shunt around said second relay, and a shunt-controlling switch under operative control of the armature of said second relay.

50. The combination with a relay in a current path between two terminals of a resistance in said current path, a switch for said path, an armature for said relay controlling said switch, a second relay in a separate current path between said terminals, an armature for said second relay, the two armatures together controlling said separate current path, a shunt around said second relay, and a shunt-controlling switch under operative control of the armature of said second relay.

51. The combination with a relay in a current path between two terminals of a switch for said path, an armature for said relay controlling said switch, a second relay in a separate current path between said terminals, a resistance in said separate current path, an armature for said second relay, the two armatures together controlling said separate current path, a shunt around said second relay and a shunt-controlling switch under operative control of the armature of said second relay.

52. The combination with a releasing relay in an armature-controlled current-path between two terminals, of a switch-controlled shunt-circuit around said armature-control, a starting relay in a separate switch-controlled circuit between said terminals, said starting relay having a normally-open shunt around it and controlling the switch in said separate circuit, and means operated upon attraction of the armature of said starting relay for effecting the closing of the starting relay shunt circuit and the closing of the releasing relay shunt.

53. The combination with a releasing relay in an armature-controlled current-path between two terminals, of a resistance in said current path, a switch-controlled shunt circuit around said armature-control, a starting relay in a separate switch-controlled circuit between said terminals, said relay having a normally-open shunt around it and controlling the switch in said separate circuit, and means operated upon attraction of the armature of said starting relay for effecting the closing of the starting relay shunt circuit and the closing of the releasing relay shunt.

54. The combination with a releasing relay in an armature-controlled current-path between two terminals, of a switch-controlled shunt circuit around said armature-control, a starting relay in a separate switch-controlled circuit between said terminals, a resistance in said circuit, said starting relay having a normally-open shunt around it and controlling the switch in said separate circuit, and means operated upon attraction of the armature of said starting relay for effecting the closing of the starting relay shunt circuit and the closing of the releasing relay shunt.

55. The combination with a releasing relay in an armature-controlled current-path between two terminals, of a resistance in said current-path, a switch-controlled shunt circuit around said armature-control, a starting relay in a separate switch-controlled circuit between said terminals, a resistance in said circuit, said starting relay having a normally-open shunt around it and controlling the said separate circuit, and means operated upon attraction of the armature of said starting relay for effecting the closing of the starting relay shunt circuit and the closing of the releasing relay shunt.

56. In an electrical system, the combination of a charging circuit, a relay for controlling said circuit, a second relay, a shunt circuit including the windings of said first and second relays and contacts of said second relay, a third relay having an armature adapted to initially actuate the armature of the second relay, opposed contacts on said armatures, a shunt circuit around the contacts of the second relay, including a fixed contact and a second spring-carried contact on the armature of the third relay, and a shunt circuit around the third relay including a fixed contact, and a third spring-carried contact on said third relay armature, the contacts on said third relay armature being arranged to successively close the shunt about the second relay contacts and the shunt about the third relay and to successively open the second relay contacts, the third relay shunt circuit, and the shunt circuit for the second relay contacts.

57. A battery-charging circuit comprising a current path between charging terminals including the battery and a circuit-closing switch, a second current path including a magnet controlling said switch, a relay and a double circuit-breaker controlled by said relay, a third current path including the switch control magnet, said relay and a second circuit-breaker, a fourth circuit including a second relay having a normally open shunt, and a resistance, said second relay having means for controlling said second circuit-breaker and said shunt.

58. A battery-charging circuit comprising a current path between charging terminals including the battery and a circuit-closing switch, a second current path including a magnet controlling said switch, a relay, a resistance and a double-circuit-breaker controlled by said relay, a third current path including the switch-control magnet, said relay and a second circuit-breaker, a fourth circuit including a second relay having a normally open shunt, said second relay having means for controlling said second circuit-breaker and said shunt.

59. A battery-charging circuit comprising a current path between charging terminals including the battery and a circuit-closing switch, a second current path including a magnet controlling said switch, a relay and a double-circuit-breaker controlled by said relay, a third current path including the switch-control magnet, said relay and a second circuit-breaker, a fourth circuit including a second relay having a normally-open shunt, a resistance, and a primary circuit controller, said second relay having means for controlling said second circuit-breaker and said shunt.

60. A battery-charging circuit comprising a current path between charging terminals including the battery and a circuit-closing switch, a second current path including a magnet controlling said switch, a relay, a resistance, and a double circuit-breaker controlled by said relay, a third current path including the switch-control magnet, said relay and a second circuit-breaker, a fourth circuit including a second relay having a normally open shunt, and a resistance, said second relay having means for controlling said second circuit-breaker and said shunt.

61. A battery-charging circuit comprising a current path between charging terminals including the battery and a circuit-closing switch, a second current path including a magnet controlling said switch, a relay, and a double-circuit-breaker controlled by said relay, a third current path including the switch-control magnet, said relay and a second circuit-breaker, a fourth circuit including a second relay having a normally-open shunt, and a primary circuit controller, said second relay having means for controlling said second circuit-breaker and said shunt.

62. A battery-charging circuit comprising a current path between charging terminals including the battery and a circuit-closing switch, a second current path including a magnet controlling said switch, a relay and a double-circuit-breaker controlled by said relay, a third current path including the switch-control magnet, said relay and a second circuit-breaker, a fourth circuit including a second relay having a normally-open shunt, and a primary circuit controller, said second relay having means for controlling said primary circuit controller, said second circuit-breaker and said shunt.

63. A battery-charging circuit comprising a current path between charging terminals including the battery and a circuit-closing switch, a second current path including a magnet controlling said switch, a relay, a resistance, and a double-circuit-breaker controlled by said relay, a third current path including the switch-control magnet, said relay and a second circuit-breaker, a fourth circuit including a second relay having a normally-open shunt, a resistance, and a primary circuit controller, said second relay having means for controlling said second circuit-breaker and said shunt.

64. A battery-charging circuit comprising a current path between charging terminals including the battery and a circuit-closing switch, a second current path including a magnet controlling said switch, a relay, a resistance, and a double-circuit-breaker controlled by said relay, a third current path including the switch-control magnet, said relay and a second circuit-breaker, a fourth circuit including a second relay having a normally-open shunt, and a primary circuit controller, said second relay having means for controlling said primary circuit controller, said second circuit-breaker and said shunt.

65. A battery-charging circuit comprising a current path between charging terminals including the battery and a circuit-closing switch, a second current path including a magnet controlling switch, a relay and a double-circuit-breaker controlled by said relay, a third current path including the switch-control magnet, said relay and a second circuit-breaker, a fourth circuit including a second relay having a normally-open shunt, a resistance, and a primary circuit controller, said second relay having means for controlling said primary circuit controller, said second circuit-breaker and said shunt.

66. A battery-charging circuit comprising a current path between charging terminals including the battery and a circuit-closing switch, a second current path including a magnet controlling said switch, a relay, a resistance, and a double-circuit-breaker controlled by said relay, a third current path including the switch-control magnet, said relay and a second circuit-breaker, a fourth circuit including a second relay having a normally-open shunt, a resistance, and a primary circuit controller, said second relay having means for controlling said primary circuit controller, said second circuit-breaker and said shunt.

67. A battery-charging circuit comprising a battery-circuit-closing switch and an operating magnet therefor, a relay controlling the circuit of said magnet, a resistance in the relay circuit, said relay adapted to release its armature on a diminution of voltage, and a second relay having a normally open shunt, said second relay being adapted to attract its armature at a predetermined voltage and having means for closing the circuit of said first relay, and means for controlling its own shunt circuit.

68. A battery-charging circuit comprising a battery-circuit-closing switch and an operating magnet therefor, a relay controlling the circuit of said magnet, said relay adapted to release its armature on a diminution of voltage, and a second relay having a normally-open shunt, a resistance in the circuit of the second relay, said second relay being adapted to attract its armature at a predetermined voltage and having means for closing the circuit of said first relay, and means for controlling its own shunt circuit.

69. A battery-charging circuit comprising a battery-circuit-closing switch and an operating magnet therefor, a relay controlling the circuit of said magnet, a resistance in the relay circuit, said relay adapted to release its armature on a diminution of voltage, and a second relay having a normally-open shunt, a resistance in the circuit of the second relay, said second relay being adapted to attract its armature at a predetermined voltage and having means for closing the circuit of said first relay, and means for controlling its own shunt circuit.

70. A battery-charging circuit comprising a battery-circuit-closing switch and an operating magnet therefor, a relay controlling the circuit of said magnet, a resistance in the relay circuit, said relay adapted to release its armature on a diminution of voltage, and a second relay having a normally-open shunt but included in a normally-closed current path between the charging circuit terminals, said second relay being adapted to attract its armature at a predetermined voltage and having means for controlling the circuit of said first relay, means for controlling its own shunt circuit and means for controlling said current path.

71. A battery-charging circuit comprising a battery-circuit-closing switch and an operating magnet therefor, a relay controlling the circuit of said magnet, said relay adapted to release its armature on a diminution of voltage, and a second relay having a normally-open shunt but included in a normally-closed current path between the charging circuit terminals, a resistance in the circuit of the second relay, said second relay being adapted to attract its armature at a predetermined voltage and having means for closing the circuit of said first relay, means for controlling its own shunt circuit and means for controlling said current path.

72. A battery-charging circuit comprising a battery-circuit-closing switch and an operating magnet therefor, a relay controlling the circuit of said magnet, a resistance in the relay circuit, said relay adapted to release its armature on a diminution of voltage, and a second relay having a normally-open shunt but included in a normally-closed current path between the charging circuit terminals, a resistance in the circuit of the second relay, said second relay being adapted to attract its armature at a predetermined voltage and having means for closing the circuit of said first relay, means for controlling its own shunt circuit and means for controlling said current path.

73. A battery-charging circuit comprising a battery-circuit-closing switch, a controlling magnet for said switch, a relay having a circuit, a current path including a second relay having around it a normally-open shunt, an armature for said second relay, said armature having spring-carried circuit-controlling devices for closing in succession the first relay circuit and the shunt circuit.

74. The combination with a relay in a current path between two terminals of a resistance in said current path, a switch for said path, an armature for said relay controlling said switch, a second relay in a separate current path between said terminals, a resistance in said separate current path, an armature for said second relay, the two armatures together controlling said separate current path, a shunt around said second relay and a shunt-controlling switch under operative control of the armature of said second relay.

75. In a storage battery system, the combination of a charging circuit, a relay for controlling said circuit, a primary energizing circuit for said relay, a starting relay controlled by current flow from a charging current supply source for controlling said primary energizing circuit, a resistance in said starting relay circuit, a holding circuit of increased resistance for said charging circuit relay, a releasing relay controlled at certain times by said starting relay for controlling said holding circuit, and means for disabling said starting relay to cause opening of said primary energizing circuit after closure of said holding circuit.

76. In a storage battery system, the combination of a charging circuit, a relay for controlling the connection of said charging circuit with a charging current supply circuit, a starting relay, a releasing relay, a starting circuit including said starting relay and a resistance and normally-closed through contacts of said starting and releasing relays, said starting circuit being connected with the supply circuit, a primary energizing circuit for said charging circuit controlling relay closed upon actuation of said starting relay, a holding circuit for said charging circuit controlling relay controlled conjointly by the armatures of said starting and releasing relays, and means for disabling said starting relay whereby the primary energizing circuit will be opened and the holding circuit controlled solely by said releasing relay.

77. In a storage battery system, the combination of a charging circuit, a relay for controlling the connection of said charging circuit with a charging current supply circuit, a starting relay, a releasing relay, a starting circuit including said starting relay and a resistance and normally closed through contacts of said starting and releasing relays, said starting circuit being connected with the supply circuit, a primary energizing circuit for said charging circuit controlling relay closed upon actuation of said starting relay, a holding circuit for said charging circuit controlling relay controlled conjointly by the armatures of said starting and releasing relays, and means for disabling said starting relay whereby the primary energizing circuit will be opened and the holding circuit controlled solely by said releasing relay, the winding of the releasing relay being included in both said primary and holding circuits.

78. In a storage battery system, the combination of a charging circuit, a relay for controlling the connection of said charging circuit with a charging current supply circuit, a starting relay, a releasing relay, a starting circuit including said starting relay and a resistance and normally closed through contacts of said starting and releasing relays, said starting circuit being connected with the supply circuit, a primary energizing circuit for said charging circuit controlling relay closed upon actuation of said starting relay, a holding circuit for said charging circuit controlling relay controlled conjointly by the armatures of said starting and releasing relays, means for maintaining closure of the primary circuit controlling the closing operation of the holding circuit, and means for disabling the starting relay after the closure of said holding circuit whereby said primary circuit is opened and the holding circuit controlled solely by the releasing relay.

79. In a storage battery system, the combination of a charging circuit, a relay for controlling the connection of said charging circuit with a charging current supply circuit, a starting relay, a releasing relay, a starting circuit including said starting relay and a resistance and normally closed through contacts of said starting and releasing relays, said starting circuit being connected with the supply circuit, a primary energizing circuit for said charging circuit controlling relay closed upon actuation of said starting relay, a holding circuit for said charging circuit controlling relay controlled conjointly by the armatures of said starting and releasing relays, and a shunt for the starting relay effective after closure of the holding circuit to disable the starting relay whereby the primary circuit is opened and the holding circuit controlled solely by the releasing relay.

80. In a storage battery system, the combination of a charging circuit, a relay for controlling the connection of said charging circuit with a charging current supply circuit, a starting relay, a releasing relay, a starting circuit including said starting relay and a resistance and normally closed through contacts of said starting and releasing relays, said starting circuit being connected with the supply circuit, a primary energizing circuit for said charging circuit controlling relay closed upon actuation of said starting relay, a holding circuit for said charging circuit controlling relay controlled conjointly by the armatures of said starting and releasing relays, and a shunt for the starting relay effective after closure of the holding circuit to disable the starting relay whereby the primary circuit is opened and the holding circuit controlled solely by the releasing relay, said shunt being controlled by said starting relay.

81. In a storage battery system, the combination of a charging circuit, a relay for controlling the connection of said charging circuit with a charging current supply circuit, a starting relay, a releasing relay, a starting circuit including said starting relay and a resistance and normally closed through contacts of said starting and releasing relays, said starting circuit being connected with the supply circuit, suitable operating and controlling circuits, for the releasing relay connected with the supply circuit and controlled at times by the starting relay, and a shunt for and controlled by the starting relay.

82. In a storage battery system, the combination of a charging circuit, a charging current supply circuit, a starting relay normally connected to the charging current supply circuit, a resistance in the circuit of said starting relay, a releasing relay controlling a connection between the charging circuit and the charging supply circuit, means whereby the starting relay may operate the releasing relay at certain times, a shunt for the starting relay effective after said starting relay has operated the releasing relay, means controlled by the armature of the starting relay for breaking the connection between said starting relay and the charging current supply circuit at certain times and means controlled by the releasing relay for completing the connection between the starting relay and the charging current supply circuit.

83. In a storage battery system, the combination of a charging circuit, a charging current supply circuit, a starting relay normally connected to the charging current supply circuit, a resistance in the circuit of said starting relay, a releasing relay controlling a connection between the charging circuit and the charging current supply circuit, means whereby the starting relay may operate the releasing relay at certain times, a shunt for the starting relay effective after said starting relay has operated the releasing relay, and means controlled by the releasing relay for completing the connection between the starting relay and the charging current supply circuit.

84. In a storage battery system, the combination of a charging circuit, a charging current supply circuit, a starting relay normally connected to the charging current supply circuit, a resistance in the circuit of said starting relay, a releasing relay controlling a connection between the charging circuit and the charging current supply circuit, a shunt for and controlled by the starting relay, and means controlled by the releasing relay for completing the connection between the starting relay and the charging current supply circuit.

85. In a storage battery system, the combination of a charging circuit, a charging current supply circuit, a starting relay normally connected to the charging current supply circuit, a resistance in the circuit of said starting relay, a releasing relay controlling a connection between the charging circuit and the charging current supply circuit, means whereby the starting relay may operate the releasing relay at certain times, a shunt for and controlled by the starting relay, means controlled by the armature of the starting relay for breaking the connection between said starting relay and the charging current supply circuit at certain times, and means controlled by the releasing relay for completing the connection between the starting relay and the charging current supply circuit.

86. In a storage battery system, the combination of a charging circuit, a charging current supply circuit, a starting relay normally connected to the charging current supply circuit, a resistance in the circuit of said starting relay, a releasing relay controlling a connection between the charging circuit and the charging current supply circuit, means whereby the starting relay may operate the releasing relay at certain times, a shunt for and controlled by the starting relay, and means controlled by the armature of the starting relay for breaking the connection between said starting relay and the charging current supply circuit at certain times.

87. In a storage battery system, the combination of a charging circuit, a charging current supply circuit, a starting relay normally connected to the charging current supply circuit, a resistance in the circuit of said starting relay, a releasing relay controlling a connection between the charging circuit and the charging current supply circuit, a shunt for and controlled by the starting relay, means operated by the starting relay for closing said shunt circuit when its armature is fully attracted and means operated conjointly by the starting and releasing relays for breaking and closing the connection between the starting relay and the charging current supply circuit at certain times.

88. In a storage battery system, the combination of a charging circuit, a charging current supply circuit, a starting relay normally connected to the charging current supply circuit, a resistance in the circuit of said starting relay, a releasing relay controlling a connection between the charging circuit and the charging current supply circuit, a shunt for and controlled by the starting relay, means operated by the starting relay for closing said shunt circuit at certain times, and means for breaking and closing the connection between the starting relay and the charging current supply circuit at certain times.

89. In a storage battery system, the combination of a charging circuit, a charging current supply circuit, a starting relay normally connected to said charging current supply circuit, a resistance in the circuit of said starting relay, means controlled by the starting relay for causing the charging circuit to be connected to the charging current supply circuit at certain times, a shunt for and controlled by said starting relay and means whereby the retraction of the armature of the starting relay may break the connection of said relay with the charging current supply circuit at certain times.

90. In a storage battery system, the combination of a charging circuit, a charging current supply circuit, a starting relay normally connected to said charging current supply circuit, a resistance in the circuit of said starting relay, means controlled by the starting relay for causing the charging circuit to be connected to the charging current supply circuit at certain times and a shunt for and controlled by said starting relay.

91. In a storage battery system, the combination of a charging circuit, a charging current supply circuit, a starting relay normally connected to said charging current supply circuit, a resistance in the circuit of said starting relay, means controlled by the starting relay for causing the charging circuit to be connected to the charging current supply circuit at certain times, and means controlled by said starting relay whereby said relay will be first shunted and then disconnected from the charging current supply circuit after its armature has been attracted.

92. In a storage battery system, the combination of a charging circuit, a relay controlling the connection of said charging circuit with a current supply circuit, a starting relay and a releasing relay having their armatures electrically and mechanically associated, an energizing circuit for said starting relay connected with said current supply circuit and normally including said armatures and a resistance, a primary energizing circuit for said charging circuit controlling relay including said releasing relay and having its connection with the supply circuit controlled by said starting relay, the current flow through said primary energizing circuit being insufficient to cause the releasing relay to move its armature to attracted position, but the movement of said armature to attracted position being assisted by the mechanically associated armature of the starting relay, a holding circuit for the charging circuit controlling relay including said releasing relay and closed when said releasing relay armature has been moved to attracted position, said starting relay being adapted to shunt itself during the closing operation of the holding circuit whereby its armature is disengaged from the releasing relay armature and the primary energizing circuit opened and the energization of the charging circuit electromagnet controlled solely by the releasing relay.

93. A battery-charging circuit comprising a battery-circuit closing switch, a relay, means whereby said relay may control said battery-circuit closing switch, means whereby said relay will release its armature on a diminution of voltage, a second relay having a normally-open shunt, a resistance in the circuit of the second relay, said second relay being adapted to attract its armature at a predetermined voltage and having means for actuating the first relay and means for controlling its own shunt circuit.

In testimony whereof, I affix my signature in presence of two witnesses.

CLARENCE E. BEACH.

Witnesses:
H. W. DOUGHTY,
C. M. CONNERTON.

Copies of this patent may be obtained for five cents each, by addressing the "Commissioner of Patents, Washington, D. C."

Corrections in Letters Patent No. 1,082,187.

It is hereby certified that in Letters Patent No. 1,082,187, granted December 23, 1913, upon the application of Clarence E. Beach, of Binghamton, New York, for an improvement in "Apparatus for Charging Storage Batteries," errors appear in the printed specification requiring correction as follows: Page 1, line 50, strike out the words "to cause said mechanism to act" and line 49, after the word "sufficient" insert the words *to cause said mechanism to act;* page 3, line 15, for the word "shows" read *show;* same page, strike out line 88; page 6, line 29, after the word "system" insert a comma; page 14, line 29, after the word "circuit" insert a comma; and that the said Letters Patent should be read with these corrections therein that the same may conform to the record of the case in the Patent Office.

Signed and sealed this 11th day of May, A. D., 1915.

[SEAL.]

R. F. WHITEHEAD,
*Acting Commissioner of Patents.*